(12) United States Patent
Janson et al.

(10) Patent No.: US 7,462,121 B2
(45) Date of Patent: Dec. 9, 2008

(54) HYBRID ELECTRIC VEHICLE POWERTRAIN WITH FOUR-WHEEL DRIVE CHARACTERISTICS

(75) Inventors: David Janson, Plymouth, MI (US); Reid Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 11/383,031

(22) Filed: May 12, 2006

(65) Prior Publication Data

US 2007/0265126 A1    Nov. 15, 2007

(51) Int. Cl.
*F16H 3/72* (2006.01)
*F16H 37/06* (2006.01)

(52) U.S. Cl. .................. 475/5; 475/6; 475/214; 74/330; 903/910; 903/917; 903/951

(58) Field of Classification Search .......... 475/5, 475/6, 8, 214; 74/330, 331; 903/903, 904, 903/910, 912, 917, 951; 180/245, 65.2
See application file for complete search history.

(56) References Cited

U.S. PATENT DOCUMENTS

| | | | |
|---|---|---|---|
| 6,460,425 B1 | 10/2002 | Bowen | |
| 6,634,247 B2 | 10/2003 | Pels et al. | |
| 6,648,785 B2 | 11/2003 | Porter | |
| 6,716,126 B2* | 4/2004 | Bowen | 475/5 |
| 6,887,180 B2 | 5/2005 | Pels et al. | |
| 2004/0025612 A1 | 2/2004 | Ahnert et al. | |
| 2004/0149080 A1 | 8/2004 | Pollak | |
| 2005/0101432 A1 | 5/2005 | Pels et al. | |
| 2005/0139035 A1 | 6/2005 | Lee et al. | |
| 2007/0259748 A1* | 11/2007 | Forsyth | 475/5 |

FOREIGN PATENT DOCUMENTS

| | | |
|---|---|---|
| DE | 103 05 639 A1 | 3/2004 |
| DE | 102005049992 | 4/2007 |
| EP | 1 270 301 A2 | 2/2003 |
| JP | 2003237393 | 8/2003 |

OTHER PUBLICATIONS

Search Report for B0709003.8, dated Aug. 22, 2007.

* cited by examiner

*Primary Examiner*—Tisha D Lewis
(74) *Attorney, Agent, or Firm*—David B. Kelley; Brooks Kushman P.C.

(57) ABSTRACT

A hybrid electric vehicle powertrain is disclosed. A countershaft transmission in the powertrain delivers power from an engine through countershaft gearing. Electric power from a single motor-generator complements engine power and may drive front traction wheels. Regenerative power is recovered during power delivery to rear traction wheels.

25 Claims, 4 Drawing Sheets

| | CL1 | CL2 | CL3 | 6/4 | 2/R | 1/3 | S/5 | 4x4 | Engine | Motor | Rear Whls | Front Whls |
|---|---|---|---|---|---|---|---|---|---|---|---|---|
| Engine Start, Vehicle Stopped (may pre-select 2nd) | on | | off | | | | | | Crank | Motor | No Tq | No Tq |
| Generate Electricity, Vehicle Stopped (may pre-select 2nd) | on | | off | | | | S | | Run | Gen | No Tq | No Tq |
| Engine Launch (may pre-select 2nd) | slip | | | | | 1 | | | Run | Idle | Drvn by Engine | No Tq |
| Combined Launch (may pre-select 2nd) | slip | | on | | | 1 | | | Run | Motor | Drvn by Engine | Drvn by Motor |
| Electric Launch | | | on | | | | | | Off or Idle | Motor | No Tq | Drvn by Motor |
| Engine Start During Electric Launch (may pre-select an even gear) | on | | slip | | | | S | | Crank | Motor | No Tq | Drvn by Motor |
| Drive in Rev | on | | | | R | | | | Run | | Drvn by Engine | |
| Drive in 1st (may pre-select an even gear) | on | | | | | 1 | | | Run | | Drvn by Engine | |
| Drive in 2nd (may pre-select an odd gear) | | on | | N | 2 | | | | Run | | Drvn by Engine | |
| Drive in 3rd (may pre-select an even gear) | on | | | | | 3 | | | Run | | Drvn by Engine | |
| Drive in 4th (may pre-select an odd gear) | | on | | 4 | | N | | | Run | | Drvn by Engine | |
| Drive in 5th (may pre-select an even gear) | on | | | | | N | 5 | | Run | | Drvn by Engine | |
| Drive in 6th (may pre-select an odd gear) | | on | | 6 | | N | | | Run | | Drvn by Engine | |
| Generate Electricity, Vehicle Moving (combined with Drive in Xth) | | | on | | | | | | | Gen | | Brk by Motor |
| Electric Assist (combined with Drive in Xth) | | | on | | | | | | | Motor | | Drvn by Motor |
| Regenerative Braking Drive in 1st (may pre-select even and odd gear) | | | on | | | | | | Off or Idle | Gen | No Tq | Brk by Motor |
| 4x4 (combined with any other mode) | | | | | | | | 4x4 | | | Speeds Equal Torque follows traction | |
| Alternate Generate (combined with drive in even gear) | off | | off | | | 1,3 | S | | | Gen | | No Tq |
| Alternate Generate 2 (combined with drive in even gear) | on | | on | | | N | S | | | Gen | | No Tq |
| Alternate Electric Assist (combined with drive in even gear) | off | | off | | | 1,3 | S | | | Motor | Drvne by Both | No Tq |
| Alternate Electric Assist 2 (combined with drive in even gear) | on | | on | | | N | S | | | Motor | Drvn by Both | No Tq |
| Alternate Generate (combined with drive in Rev, 1st, or 3rd) | | | off | | | | S | | | Gen | | No Tq |
| Alternate Electric Assist (combined with drive in Rev, 1st, or 3rd) | | | off | | | | S | | | Motor | Drvn by Both | No Tq |

Fig. 2

| | CL1 | CL2 | CL3 | 5/3 | 1/R | 2/4 | 6/S | 4x4 | Engine | Motor | Rear Whls | Front Whls |
|---|---|---|---|---|---|---|---|---|---|---|---|---|
| Engine Start, Vehicle Stopped (may pre-select 2nd) | | on | off | | | | S | | Crank | Motor | No Tq | No Tq |
| Generate Electricity, Vehicle Stopped (may pre-select 2nd) | | on | off | | | | S | | Run | Gen | No Tq | No Tq |
| Engine Launch (may pre-select 2nd) | slip | | | | 1 | | | | Run | Idle | Drvn by Engine | No Tq |
| Combined Launch (may pre-select 2nd) | slip | | | | 1 | | | | Run | Motor | Drvn by Engine | Drvn by Motor |
| Electric Launch | | | on | | | | | | Off or Idle | Motor | No Tq | Drvn by Motor |
| Engine Start During Electric Launch (may pre-select an even gear) | | on | slip | | | | S | | Crank | Motor | No Tq | Drvn by Motor |
| Drive in Rev | | | on | | R | N | | | Run | | Drvn by Engine | |
| Drive in 1st (may pre-select an even gear) | on | | | | 1 | N | | | Run | | Drvn by Engine | |
| Drive in 2nd (may pre-select an odd gear) | | on | | | | 2 | | | Run | | Drvn by Engine | |
| Drive in 3rd (may pre-select an even gear) | on | | | 3 | | N | | | Run | | Drvn by Engine | |
| Drive in 4th (may pre-select an odd gear) | | on | | | | 4 | | | Run | | Drvn by Engine | |
| Drive in 5th (may pre-select an even gear) | on | | | 5 | | N | | | Run | | Drvn by Engine | |
| Drive in 6th (may pre-select an odd gear) | | on | | | | | 6 | | Run | | Drvn by Engine | |
| Generate Electricity, Vehicle Moving (combined with Drive in Xth) | | | on | | | | | | | Gen | | Brk by Motor |
| Electric Assist (combined with Drive in Xth) | | | on | | | | | | | Motor | | Drvn by Motor |
| Regenerative Braking Drive in 1st (may pre-select even and odd gear) | | | on | | | | | | Off or Idle | Gen | No Tq | Brk by Motor |
| 4x4 (combined with any other mode) | | | | | | | | 4x4 | | | Speeds Equal Torque follows traction | |
| Alternate Generate (combined with drive in odd gear) | | off | off | | | 2,4 | S | | | Gen | | No Tq |
| Alternate Generate 2 (combined with drive in odd gear) | | on | off | | | N | S | | | Gen | | No Tq |
| Alternate Electric Assist (combined with drive in odd gear) | off | off | off | | | 2,4 | S | | | Motor | Drvne by Both | No Tq |
| Alternate Electric Assist 2 (combined with drive in odd gear) | off | off | off | | | N | S | | | Motor | Drvn by Both | No Tq |
| Alternate Generate (combined with drive in Rev, 2nd, or 4th) | | | off | | | | S | | | Gen | | No Tq |
| Alternate Electric Assist (combined with drive in Rev, 2nd, or 4th) | | | off | | | | S | | | Motor | Drvn by Both | No Tq |

Fig. 4

HYBRID ELECTRIC VEHICLE POWERTRAIN WITH FOUR-WHEEL DRIVE CHARACTERISTICS

CROSS-REFERENCE TO RELATED APPLICATIONS

This application is related to co-pending patent application Ser. No. 11/161,734, filed Aug. 15, 2005, and to U.S. patent application Ser. No. 11/276,568, filed Mar. 6, 2006, now U.S. Pat No. 7,424,924. Both of these applications, which are co-pending with the present application, are assigned to the assignee of the present invention.

BACKGROUND OF THE INVENTION

1. Field of the Invention

The invention relates to a hybrid electric vehicle powertrain, including a multiple-ratio transmission situated between an engine and a motor-generator, wherein engine power and motor-generator power are delivered to the traction wheels through parallel power flow paths.

2. Background Art

A known hybrid electric vehicle powertrain having two-wheel drive characteristics is disclosed in co-pending patent application Ser. No. 10/605,313, filed Sep. 22, 2003, now U.S. Pat. No. 6,994,360, which is owned by the assignee of the present invention. In the powertrain of that co-pending application, power is delivered to the traction wheels from an engine and an electric motor. A generator is electrically coupled to the motor and a battery sub-system acts as an energy storage system for the generator and the motor. Generator speed is varied to control engine speed so that the engine operates at a desired brake specific fuel consumption point on an engine performance curve. Gearing is used to divide the driving power into a mechanical power flow path and an electrical power flow path.

The powertrain disclosed in the '313 patent application requires two electric machines, each of which operates either as a generator or as a motor depending upon the operating conditions.

An all-wheel drive version of the powertrain disclosed in the '313 patent application is disclosed in co-pending patent application Ser. No. 10/747,429, filed Dec. 29, 2003, now U.S. Pat. No. 7,163,480, which also is owned by the assignee of the present invention. In the case of the powertrain disclosed in the '429 application, a traction motor is disposed on a front wheel axis of a vehicle or is drivably connected through gearing to front traction wheels, whereby driving torque is delivered to the vehicle front wheels as engine power and generator power are distributed through a divided power flow path to rear traction wheels. Both of the powertrains disclosed in the co-pending patent applications require two electric machines.

SUMMARY OF THE INVENTION

It is an objective of the present invention to provide a hybrid electric vehicle powertrain of reduced complexity compared to hybrid electric vehicle powertrains of the type indicated in the preceding background art discussion. The reduced complexity of the design of the present invention results in part from the use of only a single electric machine, which can function either as a generator or as a motor to complement the power of an engine, such as an internal combustion engine.

A further objective of the present invention is to integrate a multiple-ratio geared transmission mechanism with a single motor-generator and an internal combustion engine to establish a front wheel drive mode, a rear wheel drive mode or a four-wheel drive mode. Power flow paths from the engine and the motor-generator to the traction wheels are developed with multiple gear ratios, thereby extending the overall torque ratio spread.

The gearing of the multiple-ratio transmission mechanism is coupled to the internal combustion engine through twin (tandem) clutches, which can be selectively engaged and disengaged to drivably connect the engine to each of two torque input shafts for the transmission mechanism. The torque input shafts may be concentrically disposed, one being drivably connected to the engine through a first of the twin clutches and the other being drivably connected to the engine through a second of the twin clutches. Each torque input shaft is connected to separate torque input gear elements of the transmission mechanism.

The rotor of the motor-generator is connected through the geared transmission mechanism to one of the torque input shafts and through either of the twin clutches to the engine. The motor-generator, acting as a motor, can drive the rear wheels of the vehicle through a gear system that includes one of the twin clutches.

A planetary gear unit of the powertrain of the present invention has a torque input element, which may be the sun gear, that is connected to the rotor of the motor-generator. A four-wheel drive coupler clutch is configured to connect a second element of the planetary gear unit, which may be the carrier, to a power output shaft, whereby torque can be delivered simultaneously to rear vehicle traction wheels and through a cross-drive arrangement to a driving axle for the front vehicle traction wheels to establish a four-wheel drive mode.

The planetary gear unit of the invention includes a reaction brake for the reaction element of the gear unit, which may be the ring gear. This permits torque delivery to the front traction wheels. Provision is made for permitting the reaction brake to slip, which will allow simultaneously driving torque delivery to the traction wheels and engine cranking torque delivery through the geared transmission mechanism and one of the twin clutches. Engine cranking torque thus can be developed for engine starting when the powertrain is in an electric vehicle launch mode.

According to another feature of the invention, the gear elements of the transmission can be preselected during a ratio changing sequence. This involves selective engagement and release of the twin clutches as ratio change clutches for the individual gears of the transmission gearing are engaged and disengaged, whereby an individual gear of the transmission gearing is preselected under zero torque conditions.

A four-wheel drive coupling can be engaged and disengaged to establish and disestablish vehicle operation using front traction wheel torque, rear traction wheel torque or four-wheel drive torque.

In addition to the foregoing operating modes, the invention will permit the battery to be charged during vehicle operation. This can be achieved by permitting the front wheels to drive the motor-generator as the motor-generator acts as a generator. If at that time the vehicle driver applies the vehicle brakes, the transmission is already conditioned for regenerative braking with the motor acting as a generator. Regenerative braking can be achieved when the brake for the planetary gear unit is applied and the front traction wheels drive the rotor of the generator.

The transmission mechanism preferably is a countershaft transmission in which the countershaft is situated in parallel disposition with respect to the axis of the twin clutches. Either of two torque input elements for the countershaft gearing is connected to a separate one of the twin clutches. In one of the embodiments of the present invention, the torque input element of the countershaft gear assembly is a solid countershaft connected drivably to the engine through one of the torque input shafts for the transmission mechanism. A second torque input shaft for the countershaft gear assembly is a sleeve shaft encircling the solid countershaft. It too is drivably connected to the engine through the other of the torque input shafts for the transmission mechanism.

BRIEF DESCRIPTION OF THE DRAWINGS

FIG. 2 is a chart showing the clutch and brake engagement and release pattern for various operating modes of the hybrid electric vehicle powertrain of FIG. 1;

FIG. 4 is a chart showing the clutch and brake engagement and release pattern for the hybrid electric vehicle powertrain of FIG. 3.

PARTICULAR DESCRIPTION OF
EMBODIMENTS OF THE INVENTION

Figure 1:
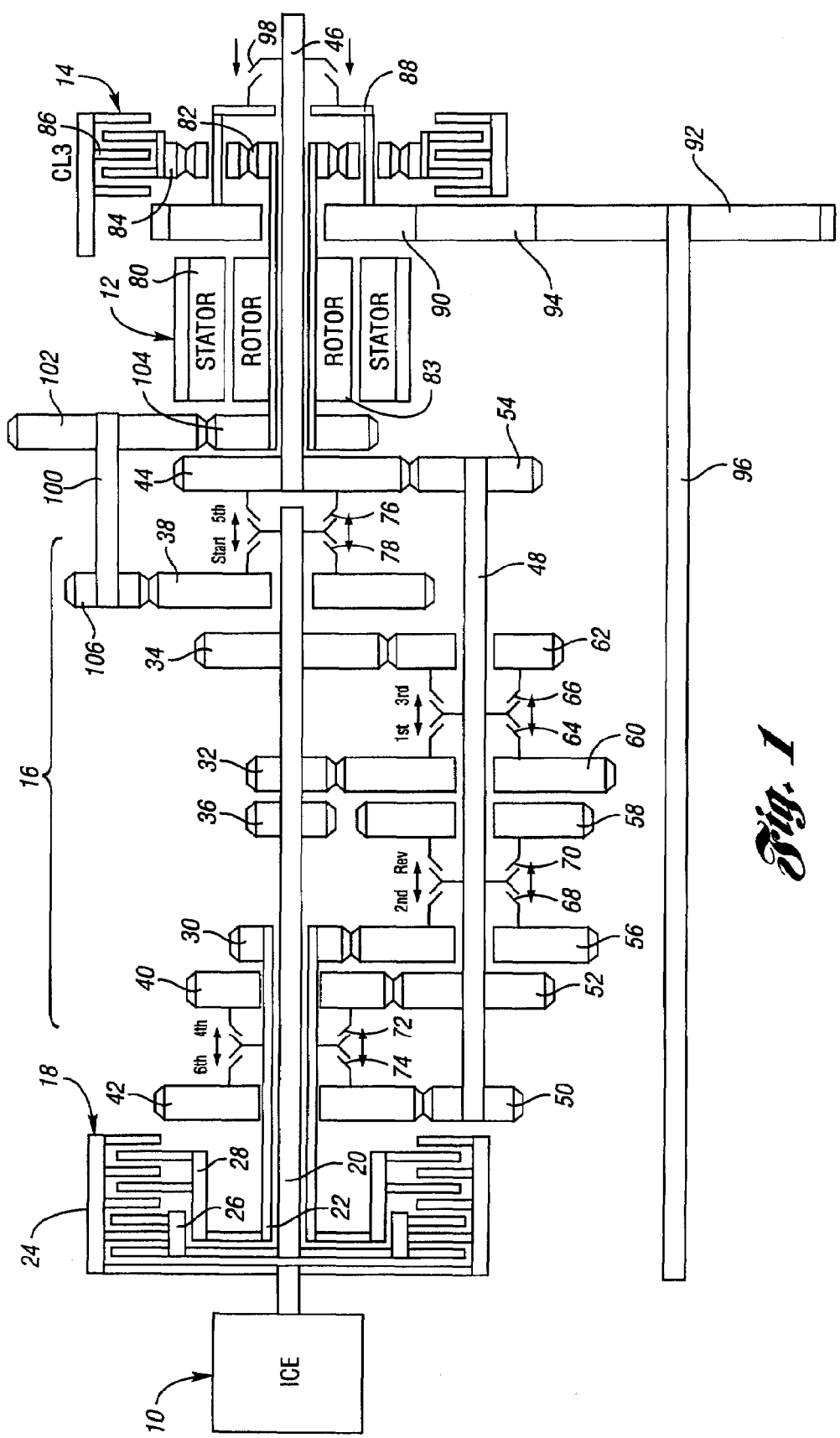
FIG. 1 is a schematic representation of a hybrid electric vehicle powertrain, including a countershaft transmission with twin torque input clutches and two countershaft assemblies in combination with a motor-generator unit, a torque multiplying planetary gearset and a reaction brake for establishing a torque reaction point for the planetary gear unit.

FIG. 1 illustrates schematically one embodiment of the invention. It comprises a countershaft transmission situated between an internal combustion engine (ICE) at 10 and a motor-generator shown at 12. A torque multiplier planetary gear unit shown at 14 defines in part a power flow path to power output portions of the powertrain in parallel disposition with respect to a power flow path through multiple-ratio transmission gearing, generally identified by numeral 16. Torque is distributed to the transmission gearing 16 through twin (tandem) friction clutches generally identified by numeral 18.

Various types of multiple-ratio transmissions could be used in practicing the invention. Although a specific countershaft transmission, shown at 16, will be described for purposes of disclosing an embodiment of the invention, other gear systems could be used as well, including transmissions with other countershaft gearing configurations and transmissions with various numbers of ratio selections. Further, although the multiple-ratio transmission illustrated in FIG. 1 has ratio selecting clutches on both a main shaft and on a countershaft, other countershaft transmission arrangements could be used with ratio selecting clutches in a different configuration.

The transmission 16 includes a solid transmission torque input shaft 20 and a transmission torque input sleeve shaft 22. The twin clutch assembly 18 selectively connects a crankshaft of engine 10 to the torque input shafts 20 and 22.

The twin clutch assembly 18 comprises a torque input friction clutch disc subassembly 24 comprising two torque output friction clutches 26 and 28. Clutch discs of the subassembly 24 are disposed in inter-digital relationship with respect to the clutch discs of the clutches 26 and 28. Clutch disc subassembly 24 is connected to the engine crankshaft, clutch 26 is connected to the solid torque input shaft 20 and clutch 28 is connected to the torque input sleeve shaft 22.

A first torque input gear 30 is drivably connected to torque input sleeve shaft 22. Second and third torque input gears 32 and 34 are drivably connected to solid torque input shaft 20. Further, reverse drive gear 36 is drivably connected to the solid torque input shaft 20. Gear 38 is mounted for rotation about the axis of solid torque input shaft 20. Gears 40 and 42 are rotatably mounted for rotation about the axis of torque input sleeve shaft 22. A torque output gear 44 is connected directly to transmission torque output shaft 46, which may be drivably connected to the rear vehicle traction wheels through a differential-and-axle assembly, not shown.

A solid transmission countershaft 48 is part of a countershaft gear assembly that includes countershaft torque input gear elements 50 and 52, which are directly connected to the countershaft 48. A countershaft torque output gear element 54 directly engages transmission gear 44.

Countershaft gear elements 56, 58, 60 and 62 are journaled for rotation about the axis of solid countershaft 48. Gear element 56 drivably engages input gear 30, gear element 58 drivably engages reverse drive gear 36, gear element 60 drivably engages torque input gear 32 and gear element 62 drivably engages gear 34.

A first ratio-change clutch 64 and a second ratio-change clutch 66 selectively connect gear elements 60 and 62, respectively, to countershaft 48. Clutches 64 and 66 typically would be synchronizer clutches, which are well known in the art, although other types of positive engagement clutches could be used depending upon design requirements. The clutches 64 and 66 include a common clutch sleeve, which can be shifted in a forward direction or a reverse direction so that one clutch is engaged as the other is released. Both clutches are in a disengaged, neutral state when the common clutch sleeve is moved to a central, neutral position.

A second ratio-change clutch 68 and a reverse drive clutch 70 selectively connect gear element 56 and gear element 58 to the countershaft 48. As in the case of the first and third ratio-change 64 and 66, one of the ratio-change clutches shown at 68 and 70 is disengaged as the other is engaged.

A fourth ratio-change clutch 72 and a sixth ratio-change clutch 74, which also function in a manner similar to ratio-change clutches 64 and 66, drivably connect torque input sleeve shaft 22 to gears 42 and 40, respectively.

A fifth ratio-change clutch 76 and an engine startup clutch 78 selectively connect solid torque input shaft 20 to gear 44 and to gear 38, respectively. These clutches also function in a manner similar to clutches 64 and 66.

The motor-generator 12 includes a fixed stator 80 and a rotor 83. The rotor is connected drivably to sun gear 82 of the planetary gear unit 14. A ring gear 84 of the gear unit 14 can be braked by friction brake 86. Planetary pinions, rotatably supported by carrier 88, drivably engage ring gear 84 and sun gear 82. The carrier 88 is drivably connected to a cross-drive torque input sprocket 90, which in turn is drivably connected to a torque output cross-drive sprocket 92 by a drive chain 94. Although a sprocket and chain drive is illustrated in FIG. 1, cross-drive gearing or a belt drive could be used instead depending upon design requirements. Torque output sprocket 92 is connected to a front traction wheel and axle assembly by a front-wheel-driveshaft 96.

A four-wheel drive, selectively-engageable clutch 98 connects carrier 88 to transmission torque output shaft 46 if torque delivery to the rear traction wheels is desired for a four-wheel drive mode. If clutch 98 is disengaged, motor torque is delivered to the front traction wheels and engine torque is delivered to the rear traction wheels.

The embodiment of FIG. 1 has a second countershaft comprising countershaft 100 with gears 102 and 106, which respectively engage gear 38 and a gear 104. Gear 104, as well as sun gear 82, are drivably connected to rotor 83.

The motor-generator 12 can be used to develop engine cranking torque if clutch 78 is engaged. If at this time all of the ratio-change clutches are disengaged and the vehicle is stopped, torque from the motor generator 12, which then would function as a motor, is delivered through countershaft gear elements 102 and 106 to gear 38 and through engaged clutch 78 to torque input shaft 20. If the friction discs of clutch assembly 26 are engaged, cranking torque is delivered to the engine. If the vehicle is operating during an electric launch with the engine off, and if the powertrain controller initiates an engine start with one of the ratio-change clutches engaged, it is necessary for reaction brake 86 to slip so that it can accommodate delivery of cranking torque to the engine while functioning as a reaction element for power delivery to the front traction wheels.

When the powertrain is operating in an electric launch mode and engine starting is occurring with clutch 78 engaged, an even numbered ratio can be preselected. This is accomplished by engaging clutches 68, 72 or 74 as the powertrain is operating in an odd numbered ratio.

If the powertrain is operating under normal road load conditions and the powertrain controller commands a battery charge, the front vehicle traction wheels can deliver driving torque to the motor-generator 12, thereby developing regenerative power that can be stored in the battery. If at this time four-wheel drive clutch 98 is disengaged and the powertrain is operating in an electric drive mode, brake 86 is engaged. If the operator then applies the vehicle wheel brakes, the powertrain already is preconditioned for the regeneration mode as the motor generator unit 12 acts as a generator.

The various operating scenarios for the transmission of FIG. 1 are indicated in the chart of FIG. 2. The clutches 26 and 28 and brake 86 are identified in FIG. 2 as CL1, CL2 and CL3, respectively. Ratio-change clutches 72 and 74 in FIG. 1 are identified in FIG. 2 as clutches 6 and 4. Second ratio-change clutch 68 and reverse clutch 70 are identified in FIG. 2 as clutches 2 and R. First ratio-change clutch 64 and third ratio-change clutch 66 are referred to in FIG. 2 as clutches 1 and 3. The engine start clutch 78 and the fifth ratio-change clutch 76 in FIG. 1 are referred to in FIG. 2 as clutches S and 5. The four-wheel drive clutch 98 of FIG. 1 is referred to as clutch 4×4 in FIG. 2.

When the engine is started and the vehicle is stopped, the second ratio may be preselected following engagement of clutch CL1. With clutch CL1 applied and clutch CL3 released, the engine may be started by engaging clutch 78. Motor-generator 12 then acts as a motor as engine cranking torque is delivered through countershaft 100 to gear 38, through shaft 20 and through clutch 26. No torque is delivered to the traction wheels from the motor generator 12 at this time.

If the powertrain is commanded to charge the battery, clutch subassembly 26 is applied and brake 86 is released. All of the ratio-change clutches are disengaged, as well as the four-wheel drive clutch 98. The motor generator 12 at this time functions as a generator as engine torque is delivered through engaged clutch 78 and through countershaft 100 and gears 102 and 106 to the rotor 83. Again no torque is delivered to the front traction wheels nor to the rear traction wheels.

If it is desired to launch the vehicle using engine power only, the clutch 26 can be allowed to slip during the initial phase of the launch. Clutch 64 is applied so that engine torque is delivered through engaged clutch 26 to the gear 32 and the gear element 60 through clutch 64. Driving torque then is delivered through gear element 54 and gear 44 to the torque output shaft 46. No torque is delivered to the front wheels at this time, and the motor-generator 12 is allowed to idle. During operation in this mode, when the engine alone is used for the vehicle launch, the second ratio can be preselected by engaging ratio clutch 68. No torque is being delivered through torque input sleeve shaft 22 at this time. Motor torque from the motor-generator unit 12 is not delivered since brake 86 is disengaged at this time. If brake 86 is engaged, a combined engine and electric motor-generator launch can be achieved as the motor generator 12 acts as a motor and drives sprockets 90 and 92 as brake 86 acts as a reaction element.

If it is desired to obtain an electric launch with torque being delivered to the front wheels and with no torque being delivered to the rear wheels, brake 86 can be applied and the engine can be idled or turned off. The motor-generator 12, acting as a motor, then drives the front wheels through the cross-drive chain and sprocket assembly and through front wheel driveshaft 96 as brake 86 acts as a reaction element.

During operation in an electric vehicle launch, the engine may be started by engaging clutch subassembly 26 and allowing brake 86 to slip. The starter clutch 78 is applied at this time as engine cranking torque is delivered through shaft 20 and engaged clutch 26. Since brake 86 is slipping, it may act as a reaction element as the front traction wheels are driven through motor-generator 12, and no torque is delivered to the rear traction wheels. Reverse drive is achieved using gears 58 and 36 and a reverse drive pinion, not shown in FIG. 1. The reverse drive pinion drivably engages gears 36 and 58. Clutch 26 is applied at this time, and reverse clutch 70 is applied. Engine torque then is delivered through clutch 26 to shaft 20, through gears 36 and 58 and through reverse clutch 70. Output shaft 46 then is driven in the reverse direction by the engine.

During operation in the first gear ratio using engine power, clutch subassembly 26 is applied and clutch 64 is applied. Engine power then is delivered through gears 32 and 60, through countershaft 48 and through gears 54 and 44 to the torque output shaft 46. At this time, any even-numbered gear ratio can be preselected by engaging the appropriate ratio clutch.

To obtain a ratio change to the second ratio using the engine only as a power source, clutch subassembly 28 is engaged and ratio-change clutches 72 and 74 are moved to a neutral state. Ratio clutch 68 is engaged so engine torque then is delivered through clutch subassembly 28, through gears 30 and 56, through ratio-change clutch 68 and through the countershaft 48 to the torque output shaft 46 and through gears 54 and 44. The motor-generator 12 is inactive at this time. During operation in this mode, any odd-numbered gear ratio can be selected by engaging the appropriate odd-numbered ratio-change clutch 64, 66 or 76.

To obtain a drive mode in the third ratio, clutch 26 is applied and ratio-change clutch 66 is applied. Again, the motor is inactive and the engine delivers torque through clutch subassembly 26, shaft 20, gears 34 and 62, ratio-change clutch 66, and then through the countershaft 48, which drives the torque output shaft 46. During operation in third ratio, any even-numbered gear ratio can be selected by engaging the appropriate ratio-change clutch under zero torque.

Operation in the fourth ratio using engine power is achieved by engaging clutch 28, engaging ratio-change clutch 72, and moving ratio-change clutch 68 and reverse clutch 70 to a neutral state. Engine power then is delivered through clutch 28 and gear 46, which drive the gear element 52 and the countershaft 48. The motor-generator 12 is inactive as engine power is delivered to the rear wheels. At this time, any odd-numbered gear ratio can be preselected by engaging the appropriate odd-numbered ratio-change clutch.

A ratio change to the fifth ratio can be achieved by releasing clutch 28 and engaging clutch 26, moving ratio-change clutches 64 and 66 to a neutral state and engaging ratio-change clutch 76, whereby shaft 20, which is driven by clutch subassembly 26, delivers torque directly to torque output shaft 46. Again, the motor-generator 12 is inactive as engine power is delivered to the rear wheels. Any even-numbered gear ratio can be preselected by engaging the appropriate even-numbered ratio-change clutch.

Operation in the sixth ratio is achieved by disengaging clutch 26 and engaging clutch 28. The ratio-change clutch 74 is engaged and the ratio-change clutch 68 and reverse clutch 70 are shifted to a neutral state. Engine torque then is delivered through clutch 28 to sleeve shaft 22 and through ratio-change clutch 74 to gear 42 and gear element 50. Countershaft 48 then drives torque output shaft 46 as engine power drives the rear traction wheels. Again, the motor-generator unit 12 is inactive. At this time, any odd-numbered gear ratio can be selected by engaging the appropriate odd-numbered ratio-change clutch.

If the battery needs charging while the vehicle is in motion with the gearing adjusted to any forward driving ratio, and with the engine off, brake 86 can be applied so that the motor-generator 12 will be driven as regenerative braking torque at the front wheels is delivered through the driveshaft 96 and through the sprockets 90 and 92. This causes the rotor 83 to be driven as the brake 86 acts as a reaction point.

If the vehicle is conditioned for operation in any forward driving ratio, an electrical power assist can be achieved by engaging brake 86, whereby the motor-generator 12, acting as a motor, drives the front traction wheels.

During regenerative braking, brake 86 is applied and the engine is turned off or is allowed to idle. The motor-generator 12 at this time acts as a generator, and regenerative braking occurs at the front wheels. Clutches 26 and 28 are disengaged, so no torque is delivered to the rear wheels. The transmission at this time can be preselected for either even or odd gear ratios.

The four-wheel drive clutch 98 in each of the previously discussed operating modes is disengaged. It can be engaged, however, so that each of the operating modes in the preceding discussion can be combined with a four-wheel drive mode.

Alternate ways of charging the battery with the motor generator 12 acting as a generator may be obtained by engaging either clutch 64 or clutch 66 simultaneously with the engagement of clutch 78 as any one of the even-numbered ratio-change clutches is engaged and as clutch subassemblies 26 and 28 are disengaged. Battery charging can be achieved also by engaging clutch subassembly 26 and moving clutches 64 and 66 to a neutral state while clutch 78 remains engaged. This is done when the transmission is conditioned for operation in an even-numbered gear ratio.

An alternate way to obtain electric power assist when the transmission is conditioned for drive in an even-numbered gear ratio is to engage either clutch 64 or 66, as well as clutch 78, with the motor-generator 12 acting as a motor, whereby the engine and the motor both drive the rear wheels, but no torque then is delivered to the front wheels. An alternate electric power assist can be obtained also when the transmission is operating in an even-numbered gear ratio, by engaging clutch 26, moving ratio-change clutches 64 and 66 to a neutral state and applying ratio-change clutch 78. Again, the rear wheels then are driven by both the engine and the motor, but no torque is delivered to the front wheels.

Another alternate way for generating power for the battery, in combination with conditioning the transmission for operation in reverse drive, first ratio or third ratio, is obtained by applying clutch 78. The motor-generator 12 is then driven as it acts as a generator. No torque is delivered to either the rear wheels or the front wheels at this time. If the motor-generator acts as a motor, the rear wheels will be driven by both the motor and the engine, but no torque will be delivered to the front wheels.

Figure 3:
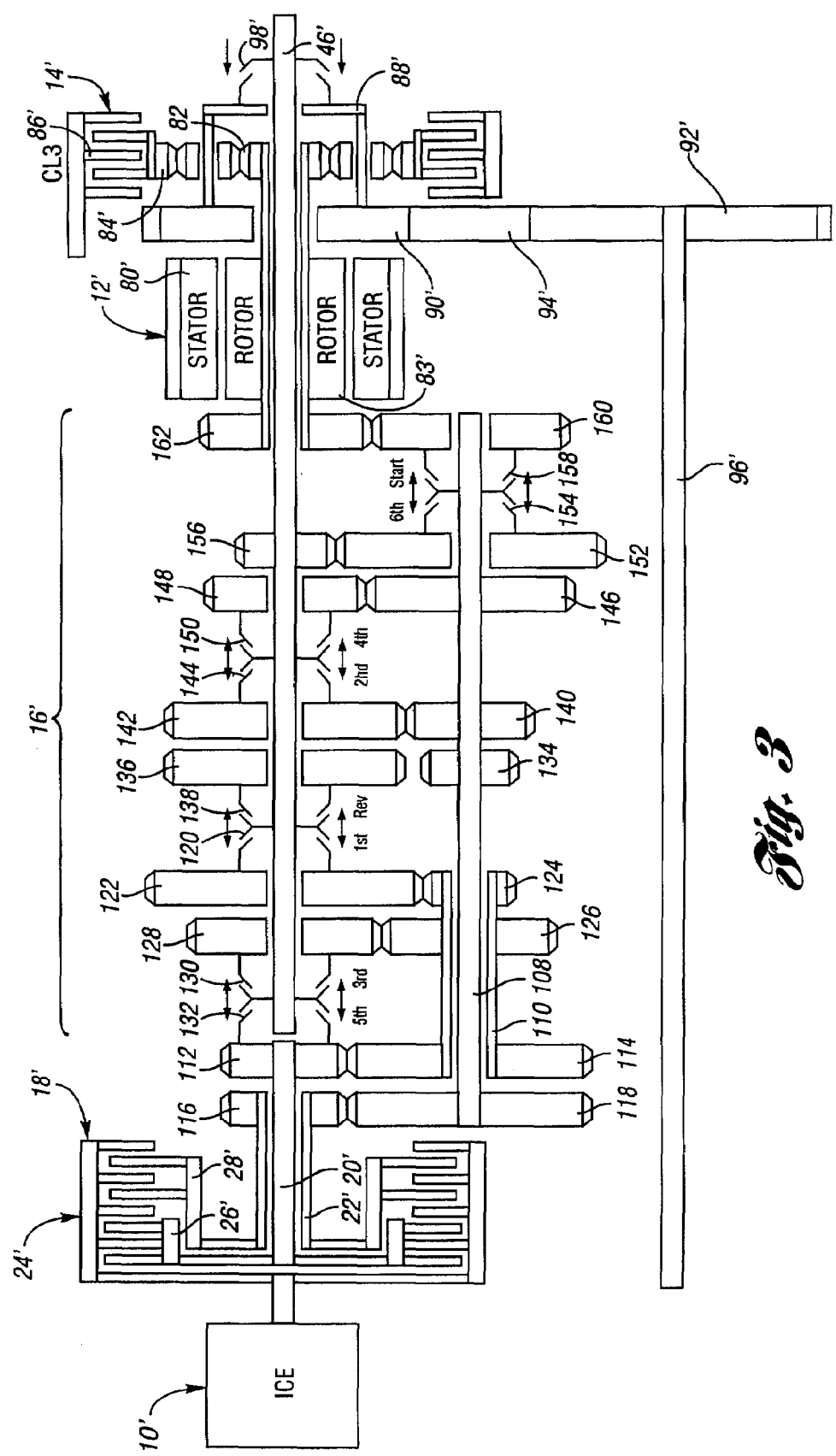
FIG. 3 is a schematic representation of another embodiment of the invention wherein the countershaft gearing includes concentric countershaft torque input shafts.

Another embodiment of the invention is illustrated in FIG. 3. In the case of FIG. 3, unlike the embodiment of FIG. 1, the countershaft gear assembly has two torque input shafts, one of which is a solid torque input shaft, as shown at 108, and the other is a sleeve shaft, as shown at 110. Another difference between the embodiment of FIG. 3 and the embodiment of FIG. 1 is that the embodiment of FIG. 3 has torque multiplication gearing at the torque input end of the transmission; but in the case of the embodiment of FIG. 1, torque multiplying gearing, including the second countershaft gear assembly, is located at the torque output end of the transmission.

The embodiments of FIGS. 1 and 3 have corresponding elements. Those corresponding elements have been identified by similar reference numerals, although in the case of FIG. 3 prime notations are added to the numerals. The functions of those elements are common for each of the embodiments.

In the embodiment of FIG. 3, engine torque is delivered through clutch 26' to solid torque input shaft 20'; and then through torque multiplying gear 112 and gear element 114 to sleeve shaft 110. Clutch subassembly 28' delivers engine torque through gear 116 and gear element 118 through the solid countershaft 108.

A first forward driving ratio is established as ratio clutch 120 is engaged. This connects gear 122 to power output shaft 46', which is connected drivably to rear traction wheels through a differential-and-axle assembly. Gear 122, which is journaled on torque input shaft 20', drivably engages gear element 124 on sleeve shaft 110. A second gear element on sleeve shaft 110, which is of larger pitch diameter than the gear element 124, is shown at 126. It engages gear 128 journaled on torque input shaft 20'. It can be connected drivably to shaft 20' by engaging ratio-change clutch 130. Gear 112 can be connected to torque input shaft 20' by engaging direct drive ratio-change clutch 132.

A reverse drive gear element 134 is connected to solid countershaft 108. It drivably engages a pinion, not shown, which in turn drivably engages reverse gear 136 journaled on torque input shaft 20'. Gear 136 is connected to torque input shaft 20' by reverse clutch 138.

Gear element 140, connected to solid countershaft 108, drivably engages gear 142 journaled on torque input shaft 20'. It may be connected to torque input shaft 20' by engaging ratio-change clutch 144.

Countershaft gear element 146, connected to solid countershaft 108, drivably engages gear 148. Ratio-change clutch 150, when it is engaged, drivably connects gear 148 to power input shaft 20'.

Gear element 152 is journaled on solid countershaft 108 and may be connected drivably to countershaft 108 by ratio-change clutch 154. Gear element 152 drivably engages gear 156 connected to torque input shaft 20'.

Gear elements 124, 134, 140, 146 and 152 are of progressively increasing pitch diameter. An engine starter clutch 158, when it is engaged, connects gear element 160 to solid countershaft 108 to effect engine cranking torque delivery to the engine in an engine cranking mode. Gear element 160 drivably engages gear 162 mounted on the axis of the power output shaft 46'. It is connected drivably to the rotor 83' for the motor generator 12'.

When clutch 28 is applied and brake 86' is released, the engine can be cranked using motor power from the motor generator unit when clutch 158 is engaged. No torque is delivered to the rear wheels nor to the front wheels at this time, and the vehicle is stopped. The first ratio clutch 120 can be preselected at this time in anticipation of a launch in the first ratio.

If the vehicle is stopped, the engine can be used to charge the battery by engaging the clutch 28' and releasing brake 86', and by engaging engine starter clutch 158.

The vehicle may be launched using engine power as torque is delivered to the rear wheels, but no torque is delivered to the front wheels. This is done by engaging ratio-change clutch 120 and by commanding clutch 26' to engage. Clutch 26' is allowed to slip during the initial phase of the launch. The second ratio can be preselected at this time by engaging ratio-change clutch 144.

It is possible to obtain a vehicle launch using engine power to drive the rear traction wheels and by using simultaneously motor power of the motor-generator unit 12' to drive the front traction wheels. This is achieved by commanding the motor-generator 12' to deliver motor torque as the first ratio-change clutch 120 remains engaged. Again, the second ratio can be preselected by engaging ratio-change clutch 144. Brake 86' is engaged during this combined launch so that the ring gear 84' can act as a reaction element.

A fully electric power launch for the vehicle can be obtained by disengaging ratio-change clutch 120 and engaging brake 86' so that torque is delivered from the rotor through the planetary gear unit 84' to drive sprocket 90'. No torque is delivered to the rear traction wheels at this time.

If the engine is commanded to start during an electric launch of the vehicle, brake 86' is commanded to slip so it can act as a reaction element for the ring gear 84'. Delivery of cranking torque thus can be delivered through the starter clutch 158, which is applied at this time. Again, no torque is delivered to the rear traction wheels. During engine starting, when the vehicle is launched using electric power, any even-numbered gear ratio can be preselected by engaging an even-numbered ratio clutch.

To condition the powertrain for reverse drive, clutch subassembly 28' is engaged and reverse clutch 138 is engaged. Further, the second and fourth ratio-change clutches 144 and 150 are disengaged (neutral state). Engine torque then is delivered through gear element 134, a pinion gear (not shown) and gear element 136 directly to the torque output shaft 46'.

Forward drive in the first ratio is obtained using engine power by engaging ratio-change clutch 120. At this time, an even-numbered gear ratio can be preselected by engaging the corresponding ratio-change clutch. Clutch 26' is engaged at this time.

Forward drive in the second ratio is obtained by engaging ratio-change clutch 144 and engaging clutch 28'. Torque is delivered through the countershaft 108 to gear element 140, which drives gear 142 and the power output shaft 46'. Any odd-numbered gear ratio can be preselected at this time by engaging the appropriate ratio-change clutch.

Forward drive in the third ratio is obtained by engaging clutch 26' and engaging ratio-change clutch 130, while clutches 120 and 138 are disengaged and assume a neutral state. Again, the rear traction wheels are driven by the engine. Any even-numbered gear ratio can be preselected at this time by engaging the appropriate ratio-change clutch.

Forward drive in the fourth ratio is obtained by engaging clutch 28' and engaging ratio-change clutch 150. The rear traction wheels then are driven by the engine. At this time, any odd-numbered gear ratio can be preselected by engaging the appropriate ratio-change clutch.

Forward drive in the fifth ratio is obtained by engaging clutch 26' and by engaging ratio-change clutch 132, which directly connects the solid input shaft 20' to the power output shaft 46'. Ratio-change clutches 120 and 138 are disengaged (neutral state). The rear traction wheels again are driven by the engine.

Forward drive in the sixth ratio is obtained by engaging clutch 28' and by engaging ratio-change clutch 154. Ratio-change clutches 144 and 150 are disengaged and assume a neutral state. The rear traction wheels again are driven by the engine.

If the motor-generator 12' is commanded to charge the battery while the vehicle is moving, brake 86' is applied. Regenerative power is delivered from the front traction wheels to drive the motor-generator 12' so that it functions as a generator rather than as a motor. This operating mode can take place while the transmission is conditioned for any driving ratio.

If the powertrain is commanded to provide an electric power assist when the vehicle is being driven with the transmission in any gear ratio, brake 86' is applied to provide a torque reaction as rotor torque is delivered through the planetary gearing 14' to the drive sprocket 90', which is drivably connected to the front traction wheels.

Regenerative braking torque at the front traction wheels is achieved by engaging brake 86'. As the motor generator 12' acts as a generator, the engine may be turned off or may idle.

The four-wheel drive clutch 98' can be applied during operation in any forward driving gear ratio, whereby torque on the carrier 88' is delivered to the power output shaft 46'.

In addition to the previously described operating modes, an electric power generator mode can be achieved when the transmission is operating in any odd-numbered gear ratio. If the clutch subassembly 28' and the clutch subassembly 26' are disengaged to interrupt torque delivery to and from the engine, and if either of the ratio-change clutches 144 and 150 is engaged, and if clutch 158 is engaged, the motor generator 12' then can function as a generator for charging the battery. Another alternate electrical energy generating mode can be achieved by engaging the clutch 28' and by disengaging brake 86'. Clutches 144 and 150 are in a disengaged neutral state and clutch 158 is engaged. The motor-generator 12' then acts as a generator.

If an electric power assist is desired when the vehicle is driven with an odd-numbered gear ratio, the clutches 26' and 28' are disengaged and clutch 144 or 150 is engaged. Clutch 158 is also engaged. Engine power, as well as motor power from motor-generator 12', then is delivered to the rear traction wheels. No power is delivered to the front traction wheels.

An alternate electric power assist is obtained when the transmission is operating in an odd-numbered gear ratio and clutches 28' and 130' are released. Ratio-change clutches 144 and 150 are shifted to a disengaged neutral state. Clutch 158 remains applied. Thus, the rear wheels are driven by both the engine and the motor-generator 12', with the motor-generator 12' acting as a motor. No torque is delivered to the front traction wheels.

If it is desired to condition the powertrain for alternate electric power generation with the transmission in the reverse drive mode, or in forward-drive second ratio, or in the forward-drive fourth ratio, brake 86' is released and clutch 158 again remains applied. No torque is delivered to the vehicle traction wheels.

If electric power assist is desired when an alternate electric power generating mode is in effect with the transmission conditioned for reverse-drive, second ratio or fourth ratio, brake 86' is released while clutch 158 remains applied. The motor-generator 12' at this time operates as a motor. Thus, the rear traction wheels are driven by both the motor and the engine and no torque is delivered to the front traction wheels.

Although embodiments of the invention have been disclosed, it will be apparent to persons skilled in the art that modifications may be made without departing from the scope of the invention. All such modifications and equivalents thereof are intended to be covered by the following claims.

What is claimed:

1. A hybrid electric vehicle powertrain comprising an engine, an electric machine and a battery system with a stator and a rotor, a multiple ratio transmission and a gear unit with gear members defining power flow paths from the engine to one torque output shaft drivably connected to one set of vehicle traction wheels;
    the gear unit having one element drivably connected to the rotor;
    a reaction brake for the gear unit;
    a second torque output shaft drivably connected to the rotor, the second torque output shaft being drivably connected to a second set of traction wheels;
    twin transmission torque input shafts; and
    two clutches alternately engageable to connect the engine to the transmission torque input shafts.

2. The hybrid electric vehicle powertrain set forth in claim 1 wherein the transmission is a countershaft transmission with transmission gear elements on a main axis that is common to an axis for the twin clutches, and a countershaft assembly on a countershaft axis;
    transmission gears on each transmission torque input shaft;
    countershaft gear elements on the countershaft axis in driving engagement with the transmission gears; and
    ratio-change clutches on at least one of the axes for establishing and disestablishing power flow paths through the transmission.

3. The hybrid electric vehicle powertrain set forth in claim 1 wherein the gear unit is a planetary gear unit including a sun gear connected to the rotor, a carrier drivably connected to the second transmission output shaft, a ring gear and said reaction brake for anchoring the ring gear to accommodate reaction torque.

4. The hybrid electric vehicle powertrain set forth in claim 2 wherein the gear unit is a planetary gear unit including a sun gear connected to the rotor, a carrier drivably connected to the second transmission output shaft, a ring gear and said reaction brake for anchoring the ring gear to accommodate reaction torque.

5. The hybrid electric vehicle powertrain set forth in claim 1 including an engine starter clutch defining in part an engine cranking torque flow path from the rotor to the engine.

6. The hybrid electric vehicle powertrain set forth in claim 2 including an engine starter clutch defining in part an engine cranking torque flow path from the rotor to the engine.

7. The hybrid electric vehicle powertrain set forth in claim 3 including an engine starter clutch defining in part an engine cranking torque flow path from the rotor to the engine.

8. The hybrid electric vehicle powertrain set forth in claim 4 including an engine starter clutch defining in part an engine cranking torque flow path from the rotor to the engine.

9. The hybrid electric vehicle powertrain set forth in claim 5 wherein one of the countershaft clutches, when engaged, and the starter clutch, when engaged, define in part a torque flow path from the rotor to the one set of traction wheels whereby the one set of traction wheels is driven both by the engine and the rotor.

10. The hybrid electric vehicle powertrain set forth in claim 5 wherein the starter clutch, when engaged, defines in part a torque flow path from the engine to the rotor whereby the engine drives the rotor to charge the electric machine and battery system.

11. The hybrid electric vehicle powertrain set forth in claim 2 wherein the two alternately engageable clutches are disposed on the main axis and comprise a common clutch portion drivably connected to the engine and separate clutch portions connected respectively to separate ones of the transmission torque input shafts.

12. The hybrid electric vehicle powertrain set forth in claim 2 wherein the countershaft assembly comprises a solid countershaft portion and a sleeve countershaft portion, the countershaft portions being coaxially disposed.

13. The hybrid electric vehicle powertrain set forth in claim 4 wherein the countershaft assembly comprises a solid countershaft portion and a sleeve countershaft portion, the countershaft portions being coaxially disposed.

14. The hybrid electric vehicle powertrain set forth in claim 5 wherein the reaction brake is adapted to slip, when it is engaged, to accommodate reaction torque during torque delivery through the gear unit to the set of vehicle traction wheels as the rotor delivers engine cranking torque through the transmission to the engine.

15. A hybrid electric vehicle powertrain comprising an engine, a multiple ratio transmission and a single motor-generator with a stator and a rotor;
    the transmission being a countershaft transmission with gears on a main axis that is common to the engine, to a first torque output shaft connected to one set of traction wheels and to the motor-generator;
    tandem clutches at a torque input side of the transmission for delivering engine torque to the transmission gears as the clutches are selectively engaged;
    the motor-generator being disposed at a torque output side of the transmission;
    planetary gearing including one planetary element drivably connected to the rotor and another planetary element drivably connected to another set of traction wheels; and
    a variable capacity brake for providing a torque reaction for the planetary gearing.

16. The hybrid electric vehicle powertrain set forth in claim 15 wherein the transmission includes a main countershaft assembly on a main countershaft axis and a power transfer countershaft on a separate axis with torque transmitting gear elements drivably engageable with transmission gears on the main axis.

17. The hybrid electric vehicle powertrain set forth in claim 16 wherein the main countershaft gear assembly comprises a solid countershaft portion and a sleeve portion surrounding the solid portion; and
    countershaft gear elements drivably connected to each countershaft portion;
    each countershaft portion being drivably connected to a separate one of the tandem clutches.

18. A hybrid electric vehicle powertrain comprising an engine, a single motor-generator, a planetary gear unit and a transmission with multiple-ratio gears;

the transmission including a twin, alternately engageable clutch assembly for establishing and disestablishing power flow paths between the engine and separate power input gears of the transmission;

the motor-generator having a rotor connected drivably to a sun gear of the planetary gear unit and to an engine starter gear of the transmission;

the planetary gear unit including a variable capacity friction brake for anchoring a ring gear of the planetary gear unit and a planetary carrier connected drivably to front vehicle traction wheels; and a four-wheel drive clutch selectively connecting the planetary carrier to front vehicle traction wheels whereby power from the engine is delivered to the front vehicle traction wheels;

the transmission including selectively engageable ratio changing clutches to effect multiple power flow paths from the twin clutch assembly to the front and rear vehicle traction wheels.

19. The hybrid electric vehicle powertrain set forth in claim 18 wherein the transmission includes a cross-drive between the planetary carrier and a driveshaft for the front vehicle traction wheels.

20. The hybrid electric vehicle powertrain set forth in claim 19 wherein the cross-drive is a sprocket and drive chain assembly including a first sprocket mounted on the axis of a driveshaft for the rear traction wheels and a second sprocket mounted on an axis of the driveshaft for the front vehicle traction wheels.

21. The hybrid electric vehicle powertrain set forth in claim 20 wherein the driving connection between the motor-generator rotor and the engine starter gear comprises a countershaft with countershaft gears connected drivably to the motor-generator rotor and an engine starter gear, and an engine starter clutch for connecting the engine starter gear to the engine through one of the twin clutches.

22. A hybrid electric vehicle powertrain comprising an engine, a single motor-generator, a planetary gear unit and a countershaft transmission with multiple-ratio gears;

a pair of power input shafts for the transmission;

a first transmission countershaft;

a second transmission countershaft concentrically disposed with respect to the first transmission countershaft;

first and second transmission power input gears drivably connected respectively to the first and second transmission countershaft assemblies;

a twin clutch assembly including first and second clutches for connecting alternately the engine to the first and second transmission power input gears;

the motor-generator having a rotor connected to a sun gear of the planetary gear unit;

a variable capacity brake for anchoring a ring gear of the planetary gear unit;

a carrier of the planetary gear unit being drivably connected to a driveshaft for front vehicle traction wheels; and a four-wheel drive clutch for connecting a planetary carrier of the planetary gear unit to rear vehicle traction wheels.

23. The hybrid electric vehicle powertrain set forth in claim 22 wherein the driving connection between the carrier of the planetary gear unit and the driveshaft for the front vehicle traction wheels comprises a cross-drive between the carrier of the planetary gear unit and the driveshaft for the front vehicle traction wheels.

24. The hybrid electric vehicle powertrain set forth in claim 23 wherein the cross-drive comprises a sprocket and drive chain assembly.

25. The hybrid electric vehicle powertrain set forth in claim 23 wherein one of the countershaft gear assemblies includes an engine starter gear mounted on the one countershaft connected drivably to the rotor of the motor-generator and an engine starter clutch in the one countershaft for selectively connecting the engine starter gear to the one countershaft whereby engine cranking torque can be delivered through one of the clutches of the twin clutch assembly to the engine.

* * * * *